Patented Oct. 1, 1929

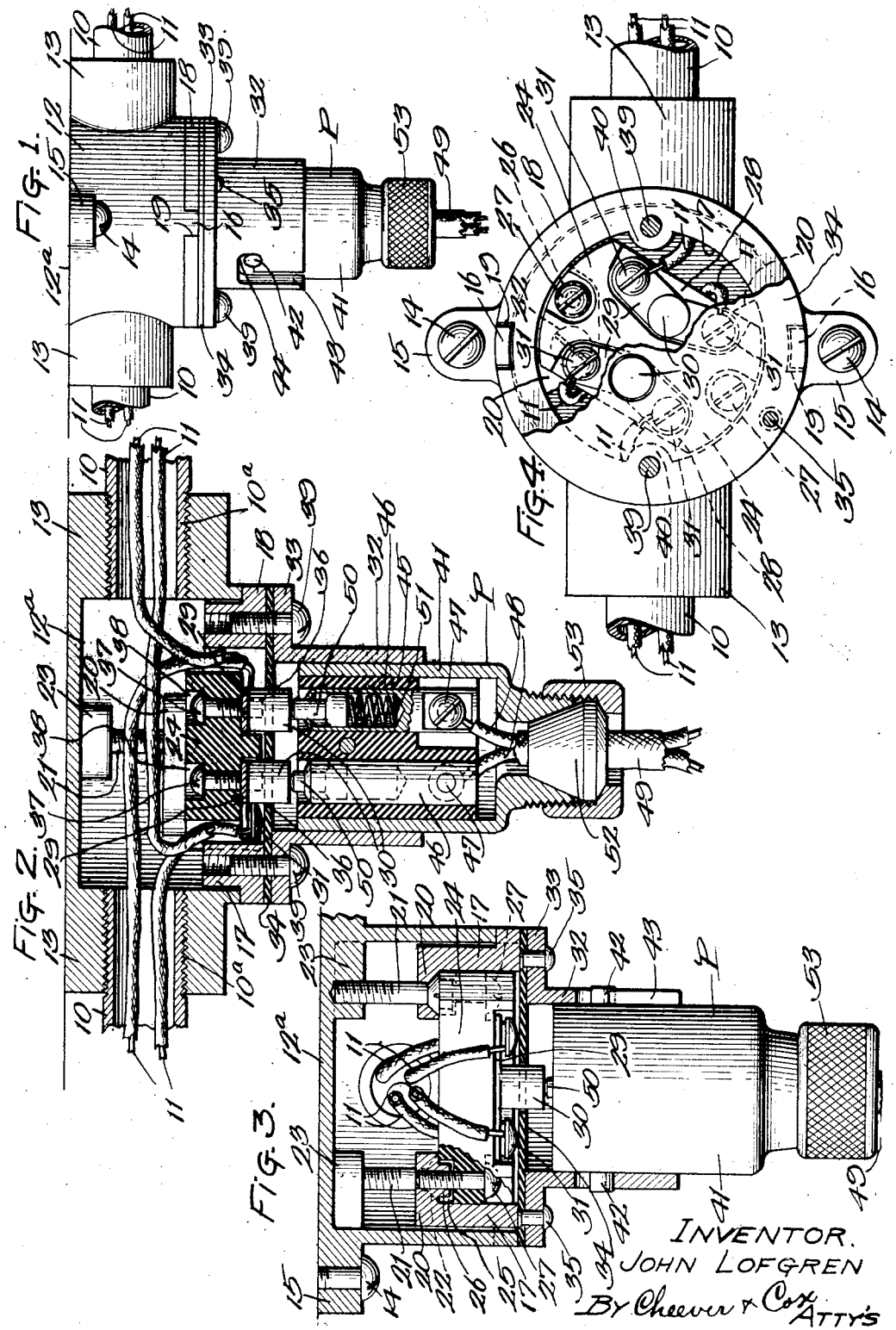

1,729,949

UNITED STATES PATENT OFFICE

JOHN LOFGREN, OF CHICAGO, ILLINOIS, ASSIGNOR TO RALCO MANUFACTURING COMPANY, OF CHICAGO, ILLINOIS, A CORPORATION OF ILLINOIS

ELECTRIC CONNECTER

Application filed July 19, 1926. Serial No. 123,409.

This invention relates to combined outlet boxes and connecters, and while it is of general application and use, it is designed particularly for the mounting of electric lamps in the cabs of locomotives.

The several electric lamps usually provided in the cab of a locomotive for general illumination and for the purpose of lighting the steam and air gauges and lubricators, are as a rule connected by drop wires to outlet boxes attached to the roof of the cab. Under service conditions, the fixtures and mountings for such lamps are subjected to extreme and continued vibration and the action of fumes and gases from the fuel as well as to steam and to the weather. These circumstances with the added rough usage ofttimes given the engine equipment by the crew, combine to create particularly severe service conditions to be met by the connecter.

It is the object of the present invention to provide a substantial and sturdy outlet box and connecter that will withstand vibration and rough usage and wherein the electrical elements, such as the terminals, contacts, insulators, etc., will be required only to serve their normal electrical functions and not be subjected to any of the strains applied to the drop cord.

Another object contemplated by the present invention, is the protection and substantial sealing of the electrical elements from steam, fumes, gases, etc., and yet permit ready access thereto.

With the above and other objects in view as will be apparent, this invention consists of the construction, combination and arrangement of parts all as hereinafter more fully described, claimed, and illustrated in the accompanying drawing, wherein:—

Fig. 1 is an elevation of the present outlet box and connecter shown in conjunction with a circuit conduit.

Fig. 2 is a central vertical section through the outlet box and connecter.

Fig. 3 is a section taken through the outlet box at right angles to the section of Fig. 2 and illustrates the connecter plug in elevation; and Fig. 4 is a face elevation, partly in section, of the outlet box.

In carrying out the present invention, an outlet box is so provided in conjunction with the conduit of the electrical feed circuit, that the feed wires may pass into or through the outlet box. A metallic cage is mounted on and in the outlet box and is spaced sufficiently from the bottom thereof to not only permit leads or taps being taken off the feed circuit or wires, but to allow the wires of additional circuits to pass through the box if so desired. This is accomplished by having the insulating block with the contacts and binding posts mounted thereon, positioned in and carried by the aforesaid cage, whereby ample space is provided below the cage and insulating block for the passage of electrical feed wires and the extension of taps therefrom to the binding posts of the insulating block.

The socket which is secured to the outlet box for the reception of the plug of the connecter is separated from the outlet box by a partition of insulating material. This partition is imperforate except for a pair of spaced apertures for the passage of the contacts of the outlet box and is permanently affixed to the socket. By this means the interior of the outlet box and its contents are largely protected from steam, fumes, gases, etc., and the system and operator are protected from grounds or short circuits in the event one or more of the binding posts or screws should become loosened or disconnected.

The plug of the connecter carrying the drop wire is supported entirely by the socket which in turn is mounted on and carried by the outlet box. The only connection between the plug and drop wire and the electrical elements in the outlet box is by the contacts of the box abutting the contacts of the plug. Thus any strains applied to the drop cord are transmitted to the socket and the outlet box and not to the electrical elements as is the case where the drop cord or wire is directly connected to the terminals or binding posts of the outlet box.

Reference being had more particularly to the drawings 10 designates the conduit pipe for the electrical feed wires 11. The terminal box 12, provided with the opposed internally threaded bushings is to be mounted on the ceiling (not shown) of the locomotive cab, by means of the screws 14 passing through projecting apertured studs or ears 15 on the exterior of the base or bottom 12ª of the box 12. In practice the conduit pipe 10 is divided at the point of insertion of the outlet box 12 and the ends 10ª thus created are threaded for cooperation with the threads of the bushings 13 of the box 12. As the passages of the bushings 13 communicate with the interior of the box 12 at points adjoining the bottom 12ª thereof, the feed wires 11 passing through the pipe 10 may likewise enter and pass through the box 12 near the bottom 12ª thereof.

The front of the box 12 opposed to the bottom 12ª is open and the edge of the wall thereof is provided with a pair of integral lugs 16 coplanar with the body of the wall and projecting outwardly from its outer edge. These lugs 16 are provided for the mounting and positioning of the cage which is inserted in the outlet box 12 and carries the insulating block, contacts, etc., in spaced relation to the bottom 12ª and wall of the box 12.

This cage comprises a collar 17, conforming in shape to that of the box 12, and having an outstanding right angular flange 18 adapted to rest on the outer edge of the wall of the box 12. At diametrically opposed points the flange 18 of the cage or collar 17 is provided with the recesses 19 of a shape and size to receive the lugs 16 on the edge of the wall of the outlet box 12. When the collar 17 is inserted in the box 12 and the lugs 16 are located in the recesses 19 the flange 18 of the collar will rest flush on the edge of the wall of the box 12 and the position of the cage with respect to the box 12 will be accurately determined by the lugs 16. This accurate positioning the cage in the box 12 quickly and accurately aligns the elements of the structure for the ready assembling thereof, as will be hereinafter seen.

The depth of the collar 17 of the cage is less than the depth of the box 12 so that the collar 17 when positioned in the box 12 is spaced from the bottom 12ª of said box and away from the feed wires 11 located in or passing through the box. To secure the cage in position in the box 12, the collar 17, at the edge thereof opposed to the flange 18, has a pair diametrically positioned ears 20 formed therefrom to extend inwardly. Apertures, countersunk at their inner ends, are formed in the ears 20 for the passage of the mounting screws 21. The heads 22 of these screws 21 are received in the countersunk ends of the passages through the ears 20 and therefore rest flush with the inner surfaces of said ears. On the inner surface of the bottom 12ª of the box 12, is a pair of bosses 23, one boss being provided for alignment with each ear 20 of the cage when the collar 17 thereof is properly positioned by the lugs 16 on the edge of the wall of the box 12. By being provided with interiorly threaded sockets which receive the screws 21, the bosses 23 act as anchors for the collar 17, whereby the latter and consequently the entire cage and the elements carried by it are securely but removably mounted in the box 12. It is to be observed that the lugs 16 cooperating with the recesses 19 of the flange 18, position the ears 20 in direct alignment with the bosses 23 so that the screws 21 may easily and readily be inserted and the cage and box assembled.

Mounted in and carried by the cage in spaced relation with respect to the bottom 12ª of the box 12, is an insulating block 24. This block 24 is made from a single piece of any suitable insulating material, so that all of the elements carried thereby are fully insulated from each other and from the elements of the cage and the box 12.

The length of the block 24 is approximately equal to the diameter of the collar 17 in which it is inserted. At its ends the insulating block 24 is curved on the radius of the collar 17, so that there is a snug fit between the ends of the block 24 and the inner face of said collar. In width the block 24 is shorter than the diameter of the collar 17 whereby open spaces are left between the sides of the block and the collar 17 through which may extend and pass electrical connections such as taps or leads between the contacts carried by the block and the feed wires 11.

Therefore it is manifest that the insulating block 24 is generally rectangular in shape with its ends curved to coincide with the curvature of the collar 17 and with its sides forming cords of the circle of said collar.

In its under face and adjoining each end the block 24 is provided with a recess of depression 25 to embrace a lug 26 formed on the adjoining ear 20. When the block 24 rests upon the ears 20 of the collar 17, the lugs 26 on said ears are received in the depressions 25 in the block. This cooperation between the lugs 26 of the ears 20 and the depressions 25 of the block 24 properly positions the block within the collar upon the ears 20, the block being so situated the screw holes in the ends thereof register with similar but interiorly threaded holes in the lugs 26, whereby attaching screws 27 may pass through such registering holes to securely attach the block to the collar.

From the foregoing it is manifest that the box 12 is mounted on the cab of a locomotive by the screws 14 independently of all other fastening means in the structure: that the cage or collar 17 is held in the box 12 by the screws 21 which fastening means are also distinct and independent of all others: and that the insulating block 24 is likewise independently mounted in the cage or collar 17 by the screws 27. Hence the various elements of the device thus far described when assembled are independently held in place and their respective fastening means serve only single functions. This reduces the strains and wear on the several fastening means and facilitates the removal of individual elements for repair without necessitating the complete disassembling of the device.

Furthermore, the cage 17, and its attendant insulating block 24 are held spaced from the bottom 12ª of the box 12, creating a housing for the wires 11 of any circuits passing through the box 12 and taps which lead to the terminals on the insulating block. The spacing of the block 24 at its sides from the ring 17 allows ample space for the taps from the feed wires 11 to pass between the cage or collar 17 to the terminal screws or binding posts on the block 24.

The lugs 16 on the wall of the box 12 and the lugs 26 on the ears 20 in cooperating respectively with the recesses 19 in the flange 18 and the depressions 25 in the block 24 insure the ready and accurate positioning of these elements with the holes for the mounting screws aligned and registered. Thus the assembling of the device is simplified.

Adjoining each side of the insulating block 24 is an elongated seat or depression 28 formed in the outer face of said block. These depressions 28, form seats for the terminal plates 29, one plate 29, being seated in each depression 28.

As these terminal plates 29 are identical, a description of one will serve for both. The terminal plate 29 is an elongated flat piece of metal coplanar throughout its length but formed angularly so that its middle portion is located nearer the center of the block 24 than its ends (see Fig. 4). Medially of its ends the terminal plate 29 is provided with a projecting contact 30 while at its ends it is pierced by the binding and attaching screws 31. These screws thread into the plate 29 and may if desired thread into the block 24 to assist in securing the plate 29 in place but they primarily serve as binding posts or terminal screws for the ends of the taps or leads from the feed wires 11.

The plate 29 is attached to the block 24 by means of a screw 37 mounted in the block with its head entirely contained in the passage 38 in the inner face of the block 24 through which said screw passes for threaded engagement with the contact 30.

Hence it will be seen that the block 24 carries two terminal plates 29 insulated by said block one from the other, each of which is provided with two terminal binding posts 31 and a centrally located projecting contact 30. Also each terminal plate 29 is secured to the block 24 independently of the binding or terminal screws 31, so that the loosening of the screws 31 will not affect the security of the plate 29 and the loosening of the screw 37 will not affect the screws 31.

In practice one of the wires 11 forms one side of the circuit and the remaining wire 11 the opposite side of said circuit. Thus if the outlet box 12 is at the end of the circuit it is only necessary to bring the ends of the wires 11 thereof to the terminal plates 29, one wire 11 to one terminal binding post or screw 31 of one plate 29 and the other to one terminal binding post or screw 31 of the remaining plate 29. This establishes the projecting contacts 30 as opposite terminals of the circuit from the wires 11.

If on the other hand it is desirable to connect the contacts 30 in parallel with other devices in the same circuit, the wire 11 forming one side of the circuit is severed and the resulting ends are respectively connected to the terminal binding posts or screws 31 of one of the plates 29. The remaining wire 11 forming the other side of the circuit is similarly severed and connected with the terminal binding posts or screws 31 of the other plate 29. As before one of the contacts 30 is thus in one side of the circuit and the remaining contact 30 is in the other side of the circuit.

By having the cage or collar 17 and insulating block 24 spaced from the bottom 12ª of the box 12 ample space is not only provided for the wires 11 actually connected to the plates 29 but also for the feed wires of other circuits which are merely passed through the box 12 and are not connected to the electrical elements thereof.

Cooperating with the terminal box 12 is a socket 32 having an outstanding flange 33 arranged as will be described, to rest parallel with the flange 18 of the collar 17. Riveted or otherwise secured to the flange 33 by the devices 35 is a partition 34 of insulating material. This partition 34 extends completely across the base of the socket 32 and is imperforate except for the companion apertures 36 through which the contacts 30 project when the device is assembled.

A pair of screws 39 pierces the flange 33 and partition 34 of the socket 32 and is threaded into enlargements 40 provided with interiorly threaded sockets and formed on the collar or cage 17. In this manner the socket is removably mounted on the outlet box with the insulating partition 34 carried by the flange 33 interposed between the socket 32 and the flange 18 of the collar 17.

By the foregoing arrangement of parts the socket 32 is entirely insulated from the outlet box 12 and its contents. This serves the double purpose of protecting the electrical elements within the box 12 from exterior gases, fumes, etc., and the operator manipulating the connecter or plug cooperating with the socket 32 and exterior equipment etc., from short circuits or grounds within the outlet box 12.

By having the insulating partition 34 permanently secured to the flange 33 of the socket 32 the latter may be moved from its place on the outlet box without regard to the partition being lost or misplaced. The simple removal of the socket 32 exposes the electrical elements in the box 12 and its replacement covers and protects these elements. In other words, the partition 34 goes with the socket 32, and in ordinary use does not become separated therefrom.

Cooperating with the socket 32 is a plug P consisting of a shell 41 having the diametrically opposed pins 42 projecting laterally therefrom at the base thereof. These pins 42 coact with the bayonet slots 43 in the wall of the socket 32 to removably attach the plug P in the said socket. At the inner end of each bayonet slot 43 is a transverse seating recess 44. The pins 42 are seated in these recesses 44 by the action of the spring contacts (to be described) of the plug P which tends to separate the plug and socket, and when so seated prevent the plug from being displaced by vibration.

Within the shell 41 is an insulating cylinder 45 in which is mounted a pair of spaced and insulated contact housings 46. The outer ends of these housings 46 are flattened and carry the binding or terminal screws 47 to which the wires 48 of the drop cord 49 are secured.

In the inner ends of the housings 46 are the movable contacts 50. These contacts 50 are projected, yieldably, from the inner end of the plug P by the coil springs 51 contained within the housings 46 and expanding between the bases of the housings and the inner ends of the contacts 50.

When the plug P is inserted into the socket 32 and the pins 42 are properly seated in the recesses 44, the ends of the contacts 50 abut against the ends of the contacts 30, thereby establishing the wires 48 of the cord 49 as a continuation of the circuit.

The wires 48 merge into the drop cord 49 and pass through a compressible member 52 held in place at the outer end of the plug P by the compression cap 53.

All of the elements are made, where possible, of heavy, substantial metal designed to withstand continued vibration and particularly severe service conditions.

As pointed out the easy removal of the socket 32 gives ready access to the interior of the box 12, from which the insulating block 24 may be easily removed without further disturbing the other elements.

Each element, such as the socket 32, block 24, cage 17, etc., are held by individual and independent fastening means so that the loosening by vibration or other causes of one of these elements will have no effect on the security of the others.

The whole is a sturdy structure capable of resisting the severe service conditions to be met in use on railroads and at the same time possesses ready accessibility for repair and adjustment.

Any stresses and strains imparted to the drop cord 49 are not transmitted to any of the electrical elements within the box 12 but are absorbed entirely by the plug P, socket 32, and the box 12 itself. Hence the electrical elements are relieved of all damaging forces, which tend to disturb and loosen the contacts and connections.

Having thus described my invention what I claim as new and desire to secure by Letters Patent is:

1. An outlet box having an insulating block therein, means for supporting said block in spaced position relative to the bottom of said box, a pair of terminal plates on the outer face of said block, said plates having terminal screws therein, a projecting contact carried by each plate, and means passing through said block from the inner side and into the contact for fixing said plate and contact on the block.

2. An outlet box having an insulating block therein, a terminal plate provided with a plurality of terminal screws and a projecting contact secured to said block, and a member taking through the block and into the terminal plate for fixing said plate on said block.

3. An outlet box having an insulating block therein, means for supporting said block spaced from and independent of the bottom of the box and with spaces between the sides of the block and the wall of the box, a terminal plate on the outer face of said block, provided with a plurality of terminal screws and a projecting contact, and a screw passing through said block and threaded into the contact for fixing the contact and plate on the block.

4. An outlet box, with a collar removably mounted therein, means for securing said collar to the bottom of the box, a rectangular insulating block carried by said collar, with spaces between its sides and said collar, independent means for attaching said block to the collar, and projecting contacts carried by said block.

5. An outlet box having one side open and bosses on its bottom, a collar inserted in the open side of the box and provided with a flange to rest on the edge of the box wall, means for securing said collar to said bosses, and an insulating block provided with projecting contacts mounted in and supported by said collar.

6. An outlet box having one side open, a collar mounted therein, means for securing said collar to the bottom of the box and in spaced position relative thereto, an insulating block carried by and in said collar and removably attached thereto, projecting contacts mounted on said block, a socket cooperating with said collar and surrounding said contacts, and an insulating partition interposed between said socket and said collar, said partition being perforated for the passage of the contacts therethrough.

7. The combination with an outlet box open at one side, of a collar mounted therein and spaced from the bottom of said box, means for securing said collar to the box bottom, an insulating block carried by said collar, means for removably attaching said block to the collar, projecting contacts carried by said block, a socket, means for attaching said socket to the collar aforesaid, and an insulating partition carried by said socket and perforated to permit the passage of the contacts therethrough.

8. The combination with an outlet box, of a collar mounted therein in spaced position relative to the bottom of said box, bosses on the box bottom, ears on the collar, means for aligning said ears and bosses, attaching means interposed between the bosses and ears to hold the collar in place, an insulating block carried by said collar having openings therein for registration with similar openings in the ears of the collar, means for registering said openings, screws passing through said openings for engagement with the ears to hold the block in place, projecting contacts mounted on said block, and a socket cooperating therewith.

In witness whereof, I have hereunto subscribed my name.

JOHN LOFGREN.